Patented June 24, 1952

2,601,254

UNITED STATES PATENT OFFICE 2,601,254

POLYMERIC COMPOSITIONS AND METHOD OF SHAPING SAME

Herman A. Bruson, Shaker Heights, and Thomas W. Riener, Rocky River, Ohio, assignors to Industrial Rayon Corporation, Cleveland, Ohio, a corporation of Delaware No Drawing. Application July 9, 1949, Serial No. 105,910

16 Claims. (Cl. 18—54)

This invention relates to the preparation of compositions of polymeric materials, and to the production of shaped articles therefrom. More specifically, the invention provides new and useful compositions of acrylonitrile polymers, and shaped articles formed therefrom. Moreover, it provides a method for preparing such shaped articles. The term "polymers" is intended herein also to include copolymers of acrylonitrile with other polymerizable substances.

Very useful polymers have been prepared from acrylonitrile with or without other polymerizable substances, for example, vinyl, vinylidene, isopropenyl and other ethylenic compounds, in which polymers at least 80% by weight are acrylonitrile. These acrylonitrile polymers possess, in many cases, desirable physical and chemical properties including toughness and solvent resistance to common organic solvents such as methyl or ethyl alcohol, glycols, acetone, ethyl ether, ethyl acetate, hydrocarbon solvents, chlorinated hydrocarbons, and the like. Because of these properties, it has been considered desirable that such polymeric materials be fashioned into fibers, films, bristles and other shaped articles.

In the production of fibers, filaments, threads, yarn, etc. it is usually necessary to prepare solutions of the acrylonitrile polymers for spinning. For this purpose it is important that the solvent be readily capable of dissolving acrylonitrile polymers and at the same time not involve objectionable operating difficulties or health hazards.

In the production of shaped articles such as, for example, in the extrusion of acrylonitrile polymer solutions to form filamentary materials, it is considered highly desirable to employ spinning solutions which are neither extremely viscous nor tend to form rigid gels at the temperatures and concentrations normally used in the formation of these materials; namely, 80° to 150° C. and 20% to 30% solids, for polymers having an average molecular weight above about 60,000 or higher. This difficulty may be alleviated, of course, by using lower concentrations of solids, or by using polymers of lower molecular weight, or by using higher extrusion temperatures. However, the use of one or more of these expedients, may result in the production of filamentary materials having inferior physical properties and appearance.

In accordance with the present invention, novel polymeric compositions may be produced which are highly suitable for the production of shaped articles of very desirable quality such as, for example, filaments, films, and the like. These polymeric compositions, in general, comprise ethylene carbonate, a water-soluble aliphatic polyhydric alcohol miscible therewith and a polymer of acrylonitrile containing in the polymer molecule at least 80% by weight of acrylonitrile. The water-soluble aliphatic polyhydric alcohol employed has the formula

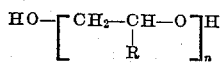

where "R" is a member of the group consisting of hydrogen, methyl, and hydroxymethyl; and "$n$" is an integer having the value 1 to 4 inclusive when "R" is hydrogen, 1 to 3 inclusive when "R" is methyl and unity when "R" is hydroxymethyl. The extrudable polymeric compositions of the present invention are hereinafter referred to as spinning solutions though they may take the form of gels, dispersions, viscous liquids or, advantageously, solutions.

The polymeric spinning solutions contain the water-soluble aliphatic polyhydric alcohol of the above formula in a ratio of not greater than 49 of ethylene carbonate to 1 of the polyhydric alcohol, or expressed in percent, the polyhydric alcohol being at least 2% of the ethylene carbonate-polyhydric alcohol content. It has been found to be particularly advantageous to employ the polyhydric alcohol components in a ratio by weight between about 49 and 2.3 of ethylene carbonate to 1 of the polyhydric alcohol (2–30%), with especial advantages being derived when the ratio is between about 19 and 3 of ethylene carbonate to 1 of polyhydric alcohol (5–25%).

In addition, it has been found that these spinning solution compositions have viscosities substantially lower than those obtained through the use of ethylene carbonate alone without the polyhydric alcohols of this invention which themselves are incapable of dissolving these polymers. For example, a mixture of ethylene carbonate containing as small an amount as 2% by weight of ethylene glycol, gives a solution of polyacrylonitrile having a lower viscosity at elevated temperatures than a similar solution of the same polymer in ethylene carbonate itself at the same temperature. As the proportion of ethylene glycol to ethylene carbonate is progressively increased, the viscosity of the solution of a given acrylonitrile polymer or copolymer in this solvent mixture progressively decreases, despite the fact that ethylene glycol is a non-solvent for the polymer until a concentration is reached where coagulation of the polymer begins to occur, at about 30% ethylene glycol. Therefore, within the range of about 2% to 30% by weight of ethylene glycol in the solvent mixture, there is a region of reduced viscosity of the polymer solutions at elevated temperatures as compared with polymer solutions under the same conditions prepared with pure ethylene carbonate.

This phenomenon, therefore, makes it possible to achieve in the spinning solution one or more of the following desirable conditions: (a) higher solids content for a given acrylonitrile polymer, (b) the employment of polymers having higher molecular weight, or (c) the employment of lower spinning temperatures.

In the same manner, but to a different degree, certain other water-soluble, liquid, aliphatic polyhydric alcohols can be employed with acrylonitrile polymer-ethylene carbonate spinning solutions with similar advantages. Typical of these are diethylene glycol, triethylene glycol, tetraethylene glycol, glycerol, propylene glycol, dipropylene glycol, and tripropylene glycol. Of the polyhydric alcohols previously mentioned, particular advantages are derived by the employment of ethylene glycol, diethylene glycol, triethylene glycol, and propylene glycol.

Shaped articles may be prepared by extruding the spinning solutions of this invention into suitable liquid coagulating media. The filamentary materials produced may with advantage be washed with an aqueous medium such as water, stretched and heat treated so as to produce oriented products having high tenacity, high elastic recovery, low shrinkage, etc.

This invention will be more fully described by the following examples, although it is understood that the invention is not intended to be limited by these examples. In these examples "parts" and "percent" of materials is intended to mean parts and percent by weight.

Example I

A copolymer of 98% acrylonitrile and 2% β-morpholinoethyl vinyl ether, having an average molecular weight of 61,000, was dissolved at 110° C. in ethylene carbonate of a purity greater than 99% to yield a solution containing 15% solids by weight. In the same manner, 15% solutions of the same polymer were prepared in various mixtures of ethylene carbonate and ethylene glycol. These solutions were poured into Gardner-Holdt viscosity tubes and placed in an oven at 110° C. Viscosities were determined by inverting the corked tubes and comparing the time required for the trapped air bubble to rise to the top of each tube at 110° C. The following table illustrates the comparative viscosities:

| Per Cent Ethylene Glycol in Ethylene Carbonate | Time in Seconds for Bubble to Rise to Top of Tube |
|---|---|
| 0 | 34.5 |
| 2 | 27.7 |
| 5 | 24.4 |
| 10 | 22.2 |
| 15 | 21.7 |
| 20 | 23.8 |
| 25 | 22.5 |
| 30 | Not homogeneous |

Example II

The above experiment was repeated at 105° C. using various mixtures of diethylene glycol.

| Per Cent Diethylene Glycol in Ethylene Carbonate | Time in Seconds for Bubble to Rise to Top of Tube |
|---|---|
| 0 | 38.1 |
| 5 | 33.2 |
| 10 | 35.4 |
| 15 | 37.3 |
| 20 | 44.2 |

It will be noted that diethylene glycol gives enhanced flow at 105° C. up to about 15% concentration in the ethylene carbonate.

Example III

The experiment of Example I was carried out at 90° C. with various mixtures of triethylene glycol.

| Per Cent Triethylene Glycol in Ethylene Carbonate | Time in Seconds for Bubble to Rise to Top of Tube |
|---|---|
| 0 | 70.1 |
| 5 | 60.2 |
| 10 | 57.4 |
| 15 | 63.7 |
| 20 | 73.5 |

It will be seen that triethylene glycol gives enhanced flow at 90° C. up to between 15-20% concentration in ethylene carbonate.

Example IV

The following table shows the enhanced flow obtained with other glycols in ethylene carbonate using a 15% solution of polyacrylonitrile (molecular weight 63,000).

| Per Cent Tetraethylene Glycol | Temperature °C | Time (Seconds) |
|---|---|---|
| 0 | 100 | 52.1 |
| 5 | 100 | 42.4 |
| 10 | 100 | 49.8 |
| 15 | 100 | 52.8 |

| Per Cent Propylene Glycol | Temperature °C | Time |
|---|---|---|
| 0 | 95 | 56.5 |
| 5 | 95 | 40.8 |
| 10 | 95 | 42.6 |
| 15 | 95 | 45.5 |
| 20 | 95 | 40.8 |

| Per Cent Tripropylene Glycol | Temperature °C | Time |
|---|---|---|
| 0 | 100 | 52.1 |
| 5 | 100 | 40.0 |
| 10 | 100 | 41.4 |
| 15 | 100 | 51.0 |

| Per Cent Glycerol | Temperature °C | Time |
|---|---|---|
| 0 | 110 | 41.6 |
| 5 | 110 | 30.6 |
| 10 | 110 | 31.2 |

Other polymers and copolymers of acrylonitrile containing at least 80% acrylonitrile in the polymer molecule show a similar drop in viscosity when the respective solutions containing 20 to 30% solids in ethylene carbonate-polyhydric alcohol mixtures herein mentioned, are compared with those in ethylene carbonate alone.

For example, copolymers of acrylonitrile with acrylic acid, methacrylic acid, maleic, fumaric and itaconic acids or their esters, amides or nitriles, vinyl esters, vinyl ethers, vinylpyridines, vinyl ketones, vinyl halides and other copolymerizable vinyl compounds having at least 80% of acrylonitrile in the polymer molecule show the same behavior with mixtures of ethylene carbonate and the glycols herein set forth.

*Example V*

A solution of 25 parts polyacrylonitrile (molecular weight 60,000) in 75 parts ethylene carbonate was prepared by heating the mixture to 115° C. This 25% solution was too viscous to extrude easily at 120° C. through a spinneret having 40 hole (0.003 inch diameter).

Using 75 parts of a solvent mixture consisting of 60 parts ethylene carbonate and 15 parts ethylene glycol to dissolve the same polymer, the 25% solution obtained could easily be extruded through the spinneret under the same conditions.

*Example VI*

A solution of 20 parts polyacrylonitrile (average molecular weight 60,000) in 80 parts solvent consisting of 20 parts ethylene glycol and 60 parts ethylene carbonate was prepared by heating the mixture to 115° C. The pale amber solution thus obtained was extruded through a 40-hole spinneret (.003 inch diameter holes) into a bath of tetraethylene glycol heated to 125° C. The coagulated bundle of filaments was washed with water and thereafter led between two guides through a steam chamber heated to 140° C. for a distance of 25 inches, where it was stretched between two rotating drums to 8.55 times its original length, the second drum being driven at about 125 meters per minute. After air drying, a purified yarn of desirable whiteness was formed having the following properties:

Denier _____ 68
Tenacity_____grams per denier__ 4.8
Elongation at break_____per cent__ 9

The yarn was then passed in a relaxed condition through a heated steam chamber positioned between two positively-driven drums having different peripheral speeds at 135° C. for five minutes. The second or take-up drum was rotated 0.855 times as rapidly as the first of the pair of drums, to yield a yarn having a tenacity of 4.6 grams per denier and an elongation at break of 19%. The yarn had a soft woolly texture when cut into staple lengths. Its shrinkage in boiling water was less than about 3%.

In practicing the present invention, various modifications of the spinning solution employed are available, permitting a desirable flexibility in viscosity, concentrations of components, etc. As previously indicated, for a given solids content and molecular weight of the polymer in the acrylonitrile polymer-ethylene carbonate spinning solutions, the employment of polyhydric alcohols permits the attainment of viscosities that are lower than those obtainable with ethylene carbonate alone. In general, the higher the molecular weight of the polyhydric alcohol employed, the smaller the amount thereof which can be admixed with a given spinning solution before incipient gelation of the polymer occurs.

As a rule, the lower polyhydric alcohols have greater viscosity-reducing powers, and in addition, provide a greater flexibility in that the amounts employed may be varied over a wider range. As stated above, particular advantages in this respect are achieved by the employment of ethylene glycol which is effective from about 2% up to about 30%, by weight of the solvent mixture. On the other hand, when using the higher polyhydric alcohols, it is more advantageous to employ concentrations above 2% but below about 20% and preferably below about 15%. In practicing the present invention, the viscosity of a spinning solution may be changed upwardly or downwardly by adjusting one or more of the following conditions as desired: (a) molecular weight of the polyhydric alcohol employed; (b) concentration of the polyhydric alcohol; (c) molecular weight of the polymer; (d) solids content of the polymer used; (e) temperature of the spinning solution.

Typical copolymers which can be used in the practice of this invention are those containing at least 80% acrylonitrile with other polymerizable compounds containing the grouping $CH_2=C=$ or $-CH=CH-$, such as vinyl esters, vinyl ethers, and vinyl ketones; acrylic acid and its esters and amide, methacrylic acid and its esters, amide, or nitrile; maleic, itaconic and fumaric acids and their esters, amides or nitriles; allyl alcohol and its esters; styrene, and substituted styrenes, e. g., chloro and dichlorostyrenes; halogenated monoethylenic compounds such as vinyl chloride, vinyl fluoride and vinylidene chloride; iso-propenyl acetate; 2-vinylpyridine; N-vinyl carbazole; and the like.

The acrylonitrile polymers and copolymers may be prepared by any suitable polymerization method such as, for example, the ammonium persulfate catalyzed polymerization of monomer or monomers dissolved or emulsified in water. Molecular weights of these polymers and copolymers are preferably within the range of 10,000 and 250,000, or even higher, although polymers having molecular weights between 40,000 and 150,000 may be used with particular advantage in the production of shaped articles such as filaments, threads, yarns, etc.

In general, the spinning solutions may be prepared by heating the finely divided acrylonitrile polymer or copolymer in the presence of the solvent mixtures of the present invention at temperatures from about 50° C. to about 100° C. Advantageously, the heated mixtures of polymer and solvent, or solutions thereof, are maintained in inert or oxygen-free atmospheres to minimize discoloration. These spinning solutions should have a solids content between about 10 and 30% solids. In the preferred form of this invention, the temperature of the spinning solution at extrusion is maintained between about 80° and 120° C. However, if desired, under suitable conditions higher temperatures may be employed such as, for example, up to about 150° C.

For various purposes it may be desirable to chemically and physically modify the polymeric compositions of this invention by the presence of other materials such as, for example, pigments, dyes, plasticizers, stabilizers, spinning agents, etc.

As previously described, shaped articles such as filaments, films, and the like, may be prepared by extruding the spinning solutions of this invention into suitable liquid coagulating media. Particularly advantageous for employment as coagulating baths in the present invention, are certain water-soluble, polyalkylene ether glycols having the formula $$HO-A-(O-A)_n-OH$$

wherein "A" is an alkylene group having not less than two nor more than three carbon atoms and "n" is an integer greater than one.

Typical polyalkylene ether glycols which can be used as coagulants are triethylene glycol, tetraethylene glycol, pentaethylene glycol, nonaethylene glycol, polyethylene glycols, tripropylene glycol, tetrapropylene glycol, polypropylene glycols (having molecular weights between about 400 and 750), etc. Of the higher polyglycol ether coagulants mentioned, those having less than about 50 alkylene groups may be employed with advantage. In general, the lower molecular weight glycols are preferred for the present process. Particular advantages, however, are derived by employing as coagulants, tetraethylene glycol, tripropylene glycol, or preferably, triethylene glycol. The coagulating medium may consist of a polyalkylene glycol ether alone, i. e. either one of such polyglycol ether coagulants or mixtures thereof, or if desired, such glycol ethers may contain suitable amounts of other materials such as, for example, varying quantities of water or organic materials, e. g. ethylene carbonate, a polyhydric alcohol solvent component, etc. These coagulants into which the spinning solutions are extruded, are preferably maintained at temperatures between about 50° and 150° C., or if desired, at higher temperatures, for example, up to about 175° C. In general, when water is employed in combination with the glycol ether coagulants, the lower bath temperatures may be employed with advantage.

The shaped articles, particularly filaments, threads, yarn and the like, which are formed from the polymeric spinning solutions of the present invention, are especially capable of being washed and purified with an aqueous medium to remove the solvent components and other impurities present in the freshly coagulated materials. For example, it has been found that faster, easier and more efficient washing of such freshly coagulated materials with water is possible when they are made from ethylene carbonate-polyhydric alcohol spinning solutions, than can be achieved with spinning solutions of ethylene carbonate alone. Accordingly, whiter threads and yarns may be produced by the present invention at lower cost, yet with greater efficiency.

The extruded materials may then be stretched up to 600–1000 percent or more either before or after washing as desired. The stretching may be accomplished in heated media such as, for example, inert liquids, vapors or gases, e. g. steam.

The washed and stretched products may be heat treated while in a relaxed condition at temperatures of between about 100° C. and 180° C. to improve their physical properties. The expression "relaxed condition" is intended to include the heat treatment of threads and yarns at no tension at all or preferably, at relatively low tensions such as, for example, between about 0.01 and 0.3 gram per denier.

Oleaginous materials such as finishing oils or waxes, may be applied to the yarn and thread products after the heat treating step, or if desired, before the heat treating step.

The spinning solutions of this invention are capable of being continuously extruded into the polyglycol ether coagulating baths above described, for long periods of time. During such spinning, there is a continuous accumulation of the ethylene carbonate and polyhydric alcohol solvent components in the coagulating medium. It has been found that the ethylene carbonate-polyhydric alcohol solvent components and particularly ethylene carbonate and ethylene glycol, can successfully be reclaimed from such coagulants with facility and a high degree of efficiency. Thus, for example, ethylene carbonate and ethylene glycol can be distilled from a used glycol ether coagulating bath with a minimum loss due to decomposition of either the solvent or the coagulant. The solvent components recovered in this manner may be recycled and re-used in the preparation of additional polymer spinning solutions. Likewise, the treated polyglycol ether coagulants remaining, from which the solvent components have been separated, may with advantage, be re-used directly to supplement the coagulating medium.

Fibers obtained in accordance with the invention can be stretched to form oriented structures of high tenacity and high elastic recovery. These stretched fibers exhibit characteristic X-ray patterns showing orientation along the fiber axis. Yarns made from these fibers may be used in the manufacture of hosiery and, because of their heat-resistance, may also be fashioned into more general, all-purpose fabrics such as for blouses, suits, skirts, etc.

We claim:

1. A composition comprising a polymer of acrylonitrile containing in the polymer molecule at least 80% by weight of acrylonitrile and as a solvent therefor a mixture comprising ethylene carbonate and a water-soluble aliphatic polyhydric alcohol miscible therewith having the formula

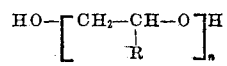

where "R" is a member of the group consisting of hydrogen, methyl, and hydroxy-methyl; and "n" is an integer having the value 1 to 4 inclusive when "R" is hydrogen, 1 to 3 inclusive when "R" is methyl and unity when "R" is hydroxy-methyl the ratio by weight being no greater than 49 of ethylene carbonate to 1 of said polyhydric alcohol; said polymer comprising between about 10 and 30% by weight of the composition.

2. A composition as defined in claim 3 in which the ratio is between about 19 and 3 of ethylene carbonate to 1 of said polyhydric alcohol.

3. A composition comprising a polymer of acrylonitrile containing in the polymer molecule at least 80% by weight of acrylonitrile and as a solvent therefor a mixture comprising ethylene carbonate and a water-soluble aliphatic polyhydric alcohol miscible therewith having the formula

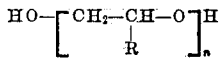

where "R" is a member of the group consisting of hydrogen, methyl, and hydroxy-methyl; and "n" is an integer having the value 1 to 4 inclusive when "R" is hydrogen, 1 to 3 inclusive when "R" is methyl and unity when "R" is hydroxy-methyl; the ratio by weight being between about 49 and 2.3 of ethylene carbonate to 1 of said polyhydric alcohol; said polymer comprising between about 10 and 30% by weight of the composition.

4. A composition as defined in claim 3 in which the polymer comprises between about 15 and 25% by weight of the composition.

5. The composition as defined in claim 3 in which the polymer has a molecular weight between about 40,000 and 150,000.

6. A composition useful for the production of filamentary materials comprising a polymer of acrylonitrile containing in the polymer molecule at least 80% by weight of acrylonitrile and as a solvent therefor a mixture comprising ethylene carbonate and a water-soluble aliphatic polyhydric alcohol miscible therewith having the formula

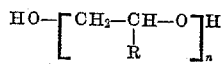

where "R" is a member of the group consisting of hydrogen, methyl, and hydroxy-methyl; and "$n$" is an integer having the value 1 to 4 inclusive when "R" is hydrogen, 1 to 3 inclusive when "R" is methyl and unity when "R" is hydroxy-methyl; the ratio by weight being between about 19 and 3 of ethylene carbonate to 1 of said polyhydric alcohol; said polymer having a molecular weight between about 40,000 and 150,000 and comprising between about 15 and 25% by weight of the composition.

7. A composition comprising a polymer of acrylonitrile containing in the polymer molecule at least 80% by weight of acrylonitrile and as a solvent therefor a mixture comprising ethylene carbonate and ethylene glycol; the ratio by weight being between about 49 and 2.3 of ethylene carbonate to 1 of ethylene glycol; said polymer comprising between about 10 and 30% by weight of the composition.

8. A composition useful for the production of filamentary material comprising a polymer of acrylonitrile containing in the polymer molecule at least 80% by weight of acrylonitrile and as a solvent therefor a mixture comprising ethylene carbonate and ethylene glycol; the ratio by weight being between about 19 and 3 of ethylene carbonate to one of ethylene glycol; said polymer comprising between about 10 and 30% by weight of the composition.

9. A composition as defined in claim 3 in which the polyhydric alcohol is diethylene glycol.

10. A composition as defined in claim 3 in which the polyhydric alcohol is triethylene glycol.

11. A composition as defined in claim 3 in which the polyhydric alcohol is propylene glycol.

12. A composition as defined in claim 3 in which the polyhydric alcohol is dipropylene glycol.

13. The method of forming a shaped article which comprises extruding into a liquid coagulating medium a composition comprising a polymer of acrylonitrile containing in the polymer molecule at least 80% by weight of acrylonitrile and a mixture comprising ethylene carbonate and a water-soluble aliphatic polyhydric alcohol miscible therewith having the formula

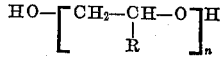

where "R" is a member of the group consisting of hydrogen, methyl, and hydroxy-methyl; and "$n$" is an integer having the value 1 to 4 inclusive when "R" is hydrogen, 1 to 3 inclusive when "R" is methyl and unity when "R" is hydroxy-methyl the ratio by weight being no greater than 49 of ethylene carbonate to 1 of said polyhydric alcohol; said polymer comprising between about 10 and 30% by weight of the composition.

14. The method of forming a shaped article which comprises extruding into a liquid coagulating medium, a composition comprising a polymer of acrylonitrile containing in the polymer molecule at least 80% by weight of acrylonitrile and a mixture comprising ethylene carbonate and a water-soluble aliphatic polyhydric alcohol and miscible therewith; said polyhydric alcohol having the formula

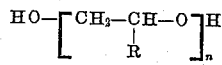

where "R" is a member of the group consisting of hydrogen, methyl, and hydroxy-methyl; and "$n$" is an integer having the value 1 to 4 inclusive when "R" is hydrogen, 1 to 3 inclusive when "R" is methyl and unity when "R" is hydroxy-methyl the ratio by weight being between about 49 and 2.3 of ethylene carbonate to 1 of said polyhydric alcohol; said polymer comprising between about 10 and 30% by weight of the composition; withdrawing the resulting formed product from said coagulating bath; washing said formed product with an aqueous medium; and stretching said washed product.

15. The method of forming a shaped article which comprises extruding into a liquid coagulating medium, a composition comprising a polymer of acrylonitrile containing in the polymer molecule at least 80% by weight of acrylonitrile and as a solvent therefor a mixture comprising ethylene carbonate and a water-soluble aliphatic polyhydric alcohol miscible therewith having the formula

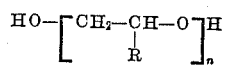

where "R" is a member of the group consisting of hydrogen, methyl, and hydroxy-methyl; and "$n$" is an integer having the value 1 to 4 inclusive when "R" is hydrogen, 1 to 3 inclusive when "R" is methyl and unity when "R" is hydroxy-methyl; the ratio by weight being between about 49 and 2.3 of ethylene carbonate to 1 of said polyhydric alcohol; said polymer comprising between about 10 and 30% by weight of the composition; withdrawing the resulting formed product from said coagulating bath; washing said formed product with an aqueous medium; and stretching said washed product while in the presence of steam.

16. The method as defined in claim 15 in which the polyhydric alcohol is ethylene glycol.

HERMAN A. BRUSON.
THOMAS W. RIENER.

REFERENCES CITED

The following references are of record in the file of this patent:

UNITED STATES PATENTS

| Number | Name | Date |
|---|---|---|
| 2,404,714 | Latham | July 23, 1946 |
| 2,426,719 | Watkins | Sept. 2, 1947 |

FOREIGN PATENTS

| Number | Country | Date |
|---|---|---|
| 896,083 | France | Apr. 17, 1944 |